Aug. 9, 1966
D. H. POLZIN
3,265,174
SPRING CLUTCH MECHANISM HAVING LOCKOUT MEANS
Filed Sept. 8, 1964
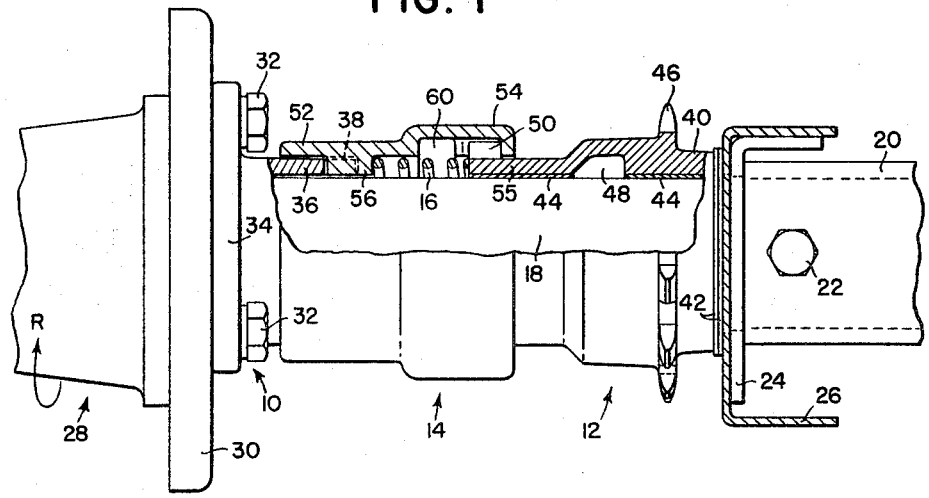
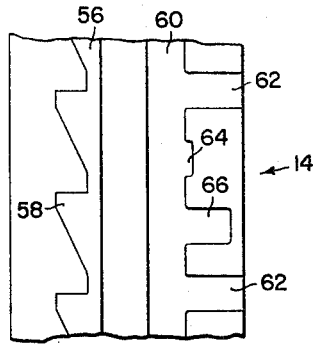
INVENTOR.
DONALD H. POLZIN
BY
*John C. Thompson*
ATTORNEY

3,265,174
SPRING CLUTCH MECHANISM HAVING
LOCKOUT MEANS
Donald H. Polzin, Horicon, Wis., assignor to Deere & Company, Moline, Ill., a corporation of Delaware
Filed Sept. 8, 1964, Ser. No. 394,892
8 Claims. (Cl. 192—67)

The present invention relates generally to clutch mechanisms, and more particularly to clutch mechanisms suitable for use on agricultural implements such as fertilizer distributors and the like.

The object and general nature of the present invention is to provide a manually operable clutch mechanism suitable for interconnecting a drive member with a driven member mounted coaxially with a wheel, the clutch construction being of durable design and relatively simple manufacture.

More particularly, it is an object of the present invention to provide a clutch construction in which drive and driven members are coaxially disposed about a relatively non-rotatable shaft, and interconnecting means are disposed coaxially about the shaft, the interconnecting means being slidable axially from a clutching position to a non-clutching position.

A further object of the present invention is to provide a clutch assembly in which an axially slidable sleeve member is disposed coaxially with the drive and driven members, the sleeve member being movable from a clutching position in which it engages drive lugs on both of the drive and driven members to a non-clutching position, the sleeve member enclosing the drive lugs in both of said positions.

A further object of the present invention is to provide a clutch construction in which a clutch sleeve, mounted coaxially with a drive and driven member, is provided with two sets of engaging surfaces, one of said sets serving as a lockout device.

A further object of the present invention is to provide a ratcheting, sliding toothed clutch with a bayonet lockout.

These and other objects and advantages of this invention will be apparent to those skilled in the art after a consideration of the following detailed description, taken in conjunction with the accompanying drawings, in which the preferred form of this invention is illustrated.

FIG. 1 is a side elevation, partially in section, showing the clutch construction of the present invention interconnecting a sprocket and a wheel hub mounted coaxially on a stub shaft.

FIG. 2 is a partially developed view showing the internal surfaces of the sleeve shown in FIG. 1.

The clutch assembly of the present invention comprises an annular drive member 10, an annular driven member 12, a sleeve clutch member 14, and a spring 16 which normally biases the sleeve 14 towards the drive member 10; the sleeve, drive member, driven member and spring all bing mounted concentrically about cylindrical non-rotatable stub axle 18.

The stub axle 18 has one end non-rotatably secured within a box axle 20 by means of a cap screw 22, and the box axle 20 is provided with an attaching flange 24 which is secured to the main frame 26 of a vehicle, such as the material distributor shown in applicant's copending application, Ser. No. 332,192 filed December 20, 1963, now Pat. No. 3,232,626. A wheel hub 28 is rotatably, non-slidably secured to the outer end of the stub axle 18 in a conventional manner not material here, the hub being provided with an attaching flange 30 to which a land wheel (not shown) may be secured. The drive member 10 is rigidly secured to the flange 30 of the hub by means of cap screws 32 which pass through the apertures in the flange 34 of the drive member. The drive member 10 has a generally cylindrical portion 36 which is preferably integrally connected at one end to the flange 34 and terminates at the other end in saw teeth 38, which in the disclosed embodiment are spaced 60° apart.

The driven member 12 is rotatably disposed about the stub axle 18 and one end 40 abuts against thrust washers 42 disposed between the end 40 and the main frame 26. The internal surface of the driven member 12 is provided with bronze bearings 44 which contact the periphery of the axle 18. A sprocket 46 is formed integrally with the driven member and a roller chain may be disposed over the sprocket to drive other related mechanisms. An annular space 48 is disposed between the bearings 44 and lubricating material may be introduced thereto through means of a conventional grease fitting (not shown) mounted on the driven member 12. The outer end of the driven member is provided with radially outwardly extending lugs 50 equally spaced apart, as for example by 120°.

The sleeve member 14 has an outer end 52 which is disposed over the saw teeth 38 of the drive member 10, and an enlarged inner end 54 which is disposed over the outer end 55 and lugs 50 of the driven member 12. The inner surface of the outer end 52 of the sleeve member (as can best be seen from FIG. 2) is provided with an inwardly projecting portion 56 provided with ratcheting saw teeth 58 (FIG. 2) adapted to matingly engage the saw teeth 38 on the drive member 10. The inner end 54 of the sleeve member is provided with a radial slot 60 which interconnects a plurality of assembly slots 62, lockout slots 64, and engaging slots 66 which are equally spaced radially about the inner surface of the sleeve. Each of the slots are spaced in the disclosed embodiment 120° apart and in suitable spacing for registry with the lugs 50. The spring 16 is disposed within the sleeve and one end engages against the rib 56 of the sleeve, the other end abutting against the outer end 55 of the driven member 12, the spring biasing the sleeve member outwardly and the secondary drive member inwardly.

In operation when it is desired to drive the member 12, the sleeve member 14 is disposed in the position shown in FIG. 1. In this position the sleeve member will transmit rotary motion of the hub member 28 in the direction indicated by the arrow R to the driven member 12. Thus, the saw teeth 38 of the primary drive member 10 will be caused to rotate about the stub axle 18 by means of the hub member 28 to which the drive member is attached by means of the bolts 32, the saw teeth 38 in turn abutting against the saw teeth 58 of the sleeve member 14, the sleeve member 14 in turn being caused to rotate and in turn causing the secondary drive member 12 to rotate about the stub axle 18 by means of the grooves 66 which drivingly engage the upstanding lugs 50. It should be noted that if the hub member 28 rotates in a direction opposite from the indicated direction R that the sleeve member 14 will not transmit the rotary motion, instead the teeth 38 and 58 merely ratcheting with respect to each other, the spring 16 permitting reciprocating axial movement of the sleeve 14 during ratcheting.

To place the clutch assembly in the non-driving position it is only necessary to force the sleeve towards the secondary drive member as far as possible and to revolve the sleeve member until the lugs 50 are positioned in the lockout slots 64. In this position the spring, acting against the inwardly projecting portion 56 of the sleeve and the lugs acting against the inner walls of the slots 64 will hold the teeth 58 out of engagement with the teeth 38. It should be noted that when the sleeve member 14 is in its non-driving position that the outer end portion 52 of the sleeve is disposed over the ratchet teeth 38 of the primary drive member 10, thus protecting these members from fertilizer dust, dirt, etc.

When the sleeve member 14 is held in its locked-out position the sleeve, spring and secondary drive are kept from shifting outwardly about the stub axle 18 by means of the roller chain (not shown) which is trained over the sprocket 46, the other end of the roller chain being trained over a non-shiftable sprocket. However, it should be noted that if a sprocket drive is not employed other generally conventional means may be employed to prevent axial shifting of the secondary drive and sleeve when these members are in their non-driving position.

While I have shown and described above the preferred structure in which the principles of the present invention have been incorporated, it is to be understood that my invention is not to be limited to the particular details, shown and described above, but that, in fact, widely different means may be employed in the practice of the broader aspects of my invention.

I claim:

1. A clutch construction comprising: a rotatable drive member, a rotatable driven member mounted concentrically with respect to said drive member, said drive and driven members being disposed a fixed distance apart from each other, each of said members having radially disposed engaging surfaces, a sleeve member mounted coaxially with said members and movable axially with respect to said members between engaged and disengaged positions, said sleeve having first and second sets of radially disposed engaging surfaces, said first set of radially disposed engaging surfaces being selectively engageable and disengageable with the engaging surface on said drive member as the sleeve member is moved between its engaged and disengaged positions, respectively, said second set of radially disposed engaging surfaces being selectively drivingly engageable and disengageable with the engaging surface on said driven member as the sleeve member is moved between its engaged and disengaged positions, respectively, spring means normally biasing said sleeve member to its engaged position, and means on one of said members to hold said sleeve member in the disengaged position.

2. The invention set forth in claim 1 in which said first set of radially disposed engaging surfaces are a plurality of axially projecting abutments having one abutting surface normal to the axis of the sleeve and the other abutment surface disposed at an angle to said axis, and the radially disposed engaging surfaces on the drive member comprising a plurality of axially projecting abutments having abutting surfaces disposed to matingly engage the abutting surfaces on the first set, the parts being so arranged and constructed that the sleeve will be caused to rotate when the drive is rotated in one direction and the sleeve may ratchet when the drive is rotated in the other direction.

3. A clutch construction comprising: a non-rotatable generally cylindrical support member, a drive member rotatably disposed about said generally cylindrical member, a driven member rotatably disposed about said generally cylindrical member, said drive and driven members being disposed a fixed distance apart from each other, a clutch sleeve member rotatable about said generally cylindrical member and axially slidable about said generally cylindrical member between engaged and disengaged axial positions, said drive member and said sleeve member being provided with a selectively engageable drive means which is moved between engaged and out of engagement positions as the sleeve member is moved between its engaged and disengaged positions, respectively, means normally biasing said sleeve member into its engaged position, and means on said sleeve and said driven member conditionable to hold the sleeve in its retracted position, said last-mentioned means drivingly interconnecting said sleeve and said driven member when the sleeve is in its first position.

4. The invention set forth in claim 3, in which said holding means on the sleeve and the driven member include first and second axially extending slot means of different length on one of said sleeve and said driven member, radial slot means interconnecting one end of the axial slot means, and lug means on the other of said sleeve and driven member, said lug means being disposed in said slot means.

5. A clutch construction comprising: a drive member, a driven member mounted for independent rotational movement coaxial to said drive member, sleeve means coaxially disposed about said drive member and said driven member and axially movable from a first position in which said sleeve means drivingly interconnects said drive member and the driven member to a second disengaged position, said sleeve and said drive member each having a plurality of saw-toothed teeth extending axially towards each other, spring means biasing said sleeve axially towards the drive member, lug means on one of said sleeve and said driven member, first and second axial slot means of different lengths on the other of said sleeve and driven member, radial slot means interconnecting said axial slot means at one end, the lug being received in one of the slot means, said spring biasing the lug away from the radial slot means, the parts being so arranged and constructed that when the lug is in the first axial slot the saw teeth of the sleeve and the drive member are in driving engagement, and when the lug is in the second axial slot the saw teeth of the sleeve and the drive member are held from engagement.

6. A clutch construction comprising: a generally cylindrical support, an annular drive member disposed about the support and having a plurality of axially extending saw-tooth type drive teeth, an annular driven member disposed about the support and mounted for independent rotational movement coaxial to the drive member, sleeve means coaxially disposed about said drive member and said driven member and axially movable from a first position in which said sleeve means drivingly interconnects the drive member and the driven member to a second disengaged position, said sleeve having axially extending saw-tooth type teeth engageable with the saw-tooth type teeth of the drive member, spring means mounted about the support and engaged with the sleeve means to normally bias the saw teeth on the sleeve towards the saw teeth on the drive member, lug means on the driven member, first and second axial slot means on the sleeve, radial slot means interconnecting said axial slot means at one end, the other end of the slots terminating within the axial edges of the sleeve, ahe lug means being receivable in one of the slot means, the parts being so arranged and constructed that when the lug means is disposed within the first axial slot means the spring means forces the saw teeth on the sleeve member into driving engagement with the saw teeth on the drive member, and when the lug means is disposed within the second axial slot means the sleeve member is held away from the drive member whereby the saw teeth may not engage with each other.

7. The invention set forth in claim 6, in which third axial slot means are provided, the third axial slot means being interconnected with said first and second axial slot means by said radial slot means, said third axial slot means extending from the radial slot to the axial edge of the sleeve whereby the sleeve may be easily assembled about said driven member.

8. The clutch set forth in claim 1 in which the spring means is disposed between said drive and driven members and enclosed by said sleeve.

References Cited by the Examiner

UNITED STATES PATENTS

| | | | |
|---|---|---|---|
| 1,793,221 | 2/1931 | Iversen | 192—67 |
| 2,401,179 | 5/1946 | Orr | 192—67 |

DAVID J. WILLIAMOWSKY, *Primary Examiner.*

A. T. McKEON, *Assistant Examiner.*